Figure 1:
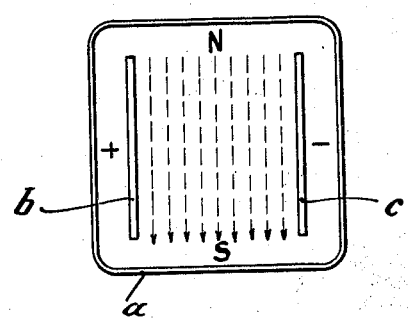

Patented Oct. 8, 1935

2,016,442

UNITED STATES PATENT OFFICE 2,016,442

PRODUCTION OF GASES BY DECOMPOSITION OF AQUEOUS ELECTROLYTES

Alfred Kügus, Stuttgart-Oberturkheim, Germany

Application May 11, 1932, Serial No. 610,591
In Germany May 13, 1931

2 Claims. (Cl. 204—1)

My invention relates to decomposing methods, more particularly to such methods wherein aqueous electrolytes are decomposed. It is an object of my invention to facilitate such methods with a particular view to the energy consumed therein.

As is known to those skilled in the art aqueous electrolytes may be decomposed with the aid of electric currents, whereby hydrogen and oxygen, or other gases, depending on the nature of the substances dissolved in the water, are developed.

My invention is based on the discovery that such decompositions may be either brought about or favorably influenced by magnetic fields and/or magnetic forces.

If for instance a permanent magnet or an electromagnetic body is brought into contact with acidulated water, a distinct development of gases occurs, which mainly consist of hydrogen which is by no means due to merely chemical phenomena, i. e. to a dissolution of the iron of the magnet, since the development of gases also occurs in such cases in which a magnet or electromagnet has been previously passivated with the aid of concentrated nitric acid to such an extent that it does not react with dilute acids.

This decomposition with the aid of magnetic forces may be used either alone or, preferably, together with electrical or chemical influences. If for instance an aqueous electrolyte underlying electrolytic decomposition is simultaneously subjected to the action of a magnetic field, the yield in gaseous decomposition products is materially increased. When subjecting acidulated water to electrolysis, I have ascertained a development of gases, which is increased for about 50 per cent when simultaneously subjecting the electrolyte to the influence of a magnetic field.

In carrying out my invention I may produce a magnetic field between the electrodes of an electrolytic cell, where the decomposition is brought about, but I may also use electrodes, which are magnets themselves, viz. permanent magnets and/or electromagnets.

Another modification of my invention consists in alternatingly arranging magnetic and non-magnetic electrodes in the same cell, and even bipolar electrodes, which are not metallically connected with the source of electricity, may be magnets and/or electromagnets.

A particularly intense action of the magnetic field is obtained, if the aqueous electrolyte to be decomposed is brought into direct contact with magnets, preferably with their poles. Similarly, I may use iron electrodes which become magnetic under the influence of the magnetic field.

The other details which should be observed when carrying out my invention do not differ from those usual in the corresponding chemical or electrolytical decomposition methods. When decomposing for instance water I may collect the gases developed on the two electrodes either separately or together. By using closed pressure-resisting decomposing vessels I may collect and withdraw the gases under pressure.

In any case the use of an electromagnetic field reduces the energy consumed in the decomposition reaction, and the yield is increased accordingly.

In the drawing affixed to this specification and forming part thereof I have diagrammatically shown electrolytic cells for the decomposition of water.

In Fig. 1 the tank $a$ contains an anode $b$ and a cathode $c$, which are connected with the positive and negative poles, respectively, of a source of electricity (not shown). Both electrodes consist of a magnetizable metal, preferably of iron. This cell is subjected to the influence of an artificial magnetic field, which is produced by means well known to those skilled in the art, for instance by strong electromagnetic coils. The direction of the magnetic field is indicated in dotted lines.

Figure 2:
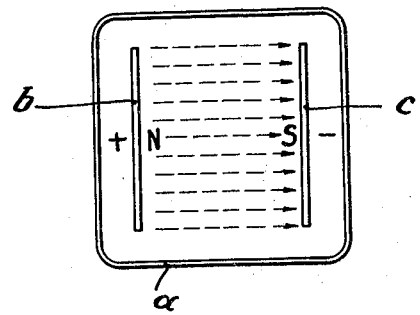

Fig. 2 is a diagrammatical plan view of a similar cell, but the direction of the magnetic field is not in parallel to the surfaces of the electrodes, but runs from the anode to the cathode.

In operating these cells I fill them with a 30 per cent solution of caustic potash, and on applying to the electrodes a sufficient voltage, I obtain a development of hydrogen and oxygen greatly in excess of the quantities which would be obtained by the same amount of electrical energy if the magnetic field were omitted.

The direction of the magnetic field according to Fig. 1, i. e. in parallel to the electrode surfaces, reduces the voltage wanted for a given decomposition effect, while the direction of the magnetic field according to Fig. 2 results in an increased gas yield.

Example 1

An electrolytic cell as shown in Fig. 1 was filled with a 30 per cent solution of caustic potash, and a direct voltage of 7.55 volts was applied to the electrodes, resulting in a current intensity of 10 amperes; the temperature of the electrolyte was kept at 18° C., the pressure being 740 mms. mercury. The magnetic field was as strong as feasible between the poles of an electromagnet arranged outside of the tank $a$. There were obtained 27.720 litres of gas per hour.

On repeating this experiment under the same conditions, but on omitting the magnetic field, a voltage of 10.6 volts proved to be necessary to obtain a current intensity of 10 amperes, and the yield was reduced to about 24.9000 litres per hour.

*Example 2*

A cell corresponding to that shown in Fig. 2 was operated under similar conditions as described with reference to Example 1, the voltage being 2.9 volts, the current intensity 5.0 amperes, the temperature 16° C. and the pressure 751 mms. mercury (absolute). On using a strong magnetic field there were obtained 15.5 ccms. gas (reduced to 0° C. and 760 mms. mercury) per ampere and minute, i. e. materially more than corresponds to the theoretical amount of 10.44 ccms.

On repeating this experiment under omission of the magnetic field, a voltage of 2.95 volts resulted in a gas yield, which exactly corresponds to 10.44 ccms. (reduced as above) per ampere and minute.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing gases by electrolytic decomposition of an aqueous electrolyte comprising subjecting the electrolyte to the electrolytic action of an electric current between magnet electrodes.

2. The method of producing gases by electrolytic decomposition of an aqueous electrolyte comprising causing an electric current to pass through the electrolyte between magnetized iron electrodes.

ALFRED KILGUS.